(12) United States Patent
Hori et al.

(10) Patent No.: US 6,511,597 B2
(45) Date of Patent: Jan. 28, 2003

(54) CHIP DISCHARGE CONVEYOR SYSTEM

(75) Inventors: Ryuichi Hori, Shiga (JP); Shigenori Matsuoka, Shiga (JP); Kenichi Endo, Shiga (JP)

(73) Assignee: Tsubakimoto Mayfran,. Inc., Shiga (JP)

( * ) Notice: Subject to any disclaimer, the term of this patent is extended or adjusted under 35 U.S.C. 154(b) by 0 days.

(21) Appl. No.: 10/024,989

(22) Filed: Dec. 19, 2001

(65) Prior Publication Data
US 2002/0166808 A1 Nov. 14, 2002

(30) Foreign Application Priority Data

May 8, 2001 (JP) ........................................ 2001-137764

(51) Int. Cl.[7] ......................... B01D 21/04; B01D 36/04; B23Q 11/00
(52) U.S. Cl. ........................ 210/298; 210/523; 210/526
(58) Field of Search ................................ 210/295, 298, 210/523, 532.1, 305, 526, 25

(56) References Cited

U.S. PATENT DOCUMENTS 5,992,642 A 11/1999 Ota
6,332,983 B1 * 12/2001 Tashiro et al.

FOREIGN PATENT DOCUMENTS

| EP | 189171 | * | 7/1986 |
| JP | 9-300171 | | 11/1997 |

* cited by examiner

Primary Examiner—Thomas M. Lithgow

(57) ABSTRACT

A chip discharge conveyor system includes a partition plate disposed below a discharge run of a circulating endless hinged belt in confronted relation to the discharge belt run along the length thereof. Outer cleats are attached to an outer circumferential surface of the hinged belt, and inner cleats are attached to an inner circumferential surface of the hinged belt. At a conveyor tail end where the hinged belt makes an upward turn, small chips, which have been caught on a return run of the hinged belt, are transferred to the partition plate while they are held by and between a cylindrical member and the hinged belt. The small chips are subsequently conveyed along the partition plate and finally discharged outside a used coolant treatment tank.

5 Claims, 12 Drawing Sheets

CHIP DISCHARGE CONVEYOR SYSTEM

BACKGROUND OF THE INVENTION

1. Field of the Invention

The present invention relates to a chip discharge conveyor system of the type wherein a used coolant containing therein chips of different sizes including cutting tips or grinding chips of iron-, aluminum- or copper-based metal that have been discharged from the machine tools during a metal working process such as cutting or grinding is charged into a used coolant treatment tank from the above, and the chips of different sizes contained in the used coolant are conveyed by a single conveyor system and subsequently discharged outside the used coolant treatment tank.

2. Description of the Related Art

When a metal working process, such as cutting or grinding, is effected on a metallic material with a machine tool, a coolant such as water containing a cutting oil or a lubricant dissolved therein is used for cooling a cutting tool, a grinding tool and/or a workpiece. Conventionally, as a chip discharge conveyor system for catching and removing chips from a used coolant discharged from the machine tool, a conveyor system comprised of a hinged belt is used.

One example of such conventional chip discharge conveyor systems is shown here in FIGS. 14 to 16. The conventional conveyor system 51 is equipped with an endless hinged belt 53 disposed inside a used coolant treatment tank 52, a driving sprocket 54 around which a side chain 53c mounted on the hinged belt 53 is wound, and a driven tail disk 55 for slide contact with the side chain 53c at a conveyor tail portion T. In these figures, reference character 52a denotes a horizontal bottom plate of the used coolant tank 52, 52b denotes a sloped bottom plate extending obliquely upward from the horizontal bottom plate 52a, 56 denotes outer cleats attached to an outer circumferential surface of the hinged belt 53, and C denotes an advancing direction of the hinged belt.

In the chip discharge conveyor system 51, a coolant containing therein chips of different size is charged into the used coolant treatment tank 52 from above (in the direction indicated by the arrow A in FIG. 14), chips of larger size (hereinafter referred to as "large chips") are caught on discharge belt run 53a on an upper side of the hinged belt 53. The discharge belt run 53a travels continuously along a horizontal path and an upwardly sloped path extending parallel to the sloped bottom plate 52b. As the discharge belt run 53a travels along the sloped path, the large chips are held by the outer cleats 56. Then, at the top of the used coolant treatment tank 52, the large chips are discharged from a discharge opening 57 to the outside of the used coolant treatment tank 52 (in the direction indicated by the arrow B in FIG. 14). Chips of smaller size (hereinafter referred to as "small chips") which have not been caught by the discharge belt run 53a sediment onto a return belt run 53b (of an inner circumferential surface of the belt 53) and the horizontal bottom plate 52a.

In the conventional chain discharging conveyor system 51 previously described, large chips (such as curled chips, ball-like chips formed by curled chips entangled together, or long chips) contained in a used coolant together with small chips are caught on the discharge belt run 53a on an upper side of the hinged belt 53. However, the small chips fall by gravity down through a clearance between adjacent two hinged plates of the discharge belt run 53a, a clearance between each longitudinal edge of the hinged belt and the corresponding sidewall of the used coolant treatment tank 52 and a clearance in the side chain. A part of such small chips sediments onto the inner circumferential surface of the return belt run 53b on the lower side of the hinged belt 53. The remainder of the small chips, that have not been caught on the return belt run 53b, sediments onto the bottom plate of the used coolant treatment tank 52 (see chips noted by K2 FIG. 4).

The small chips deposited on the inner circumferential surface of the return belt run 53b are then conveyed toward the conveyor tail portion T. As the return belt run 53b makes an upward turn at the conveyor tail portion T, deposits of small chips on the return belt run 53b drop one after another and pile up or accumulate into a rod-like mass at the upturned position of the hinged belt 53. Such piling-up of the small chips also occurs even when two sprockets connected by a shaft are used in place of the tail disk 55. The mass of small chips piled up inside the upturned belt portion gradually forces the hinged belt 53 toward vertically upward and downward directions. This may result in an accidental stop of the conveyor system 51. When such stop occurs, the hinged belt 53 must be removed so that the inside of the used coolant treatment tank 52 can be cleaned. The foregoing problem is caused due to the absence of a mechanism or a structure for enabling positive discharge of small chips adhering by sedimentation to the return belt run.

It appears clear from the foregoing description that the conventional chip discharge conveyor system composed of a hinged belt is per se unable to treat a used coolant containing chips of different sizes. To deal with this problem, a separate drum filter is disposed adjacent to the conveyor system, as disclosed in U.S. Pat. No. 5,992,642, granted Nov. 30, 1999. This arrangement, however, requires a large occupied space. In another improved conventional arrangement, a scraper type conveyor (for discharging small chips) and a hinged belt type conveyor (for discharging large chips) are disposed side by side or one above another. This arrangement requires a large space for installation and two separate power sources, which deteriorate the power consumption and cost efficiency. An additional drawback associated with the two-story arrangement is a considerable deterioration in the maintainability of the lower conveyor.

SUMMARY OF THE INVENTION

It is accordingly a general object of the present invention to overcome the foregoing drawbacks of the prior art.

A more specific object of the present invention is to provide a chip discharge conveyor system using a hinged belt, which is capable of catching and discharging large chips by means of a discharge run of the circulating endless hinged belt, and at the same time, catching small chips on a return run of the hinged belt and subsequently discharging the small chips outside the conveyor system without involving formation of a large mass of small chips at an upwardly turned portion of the return belt run, thereby ensuring that a used coolant containing chips of different sizes can be treated only by using a single chip discharge conveyor system without requiring a large space for installation and involving an accidental stop of the conveyor system caused due to jamming of the chips.

To achieve the foregoing object, according to the present invention, there is provided a chip discharge conveyor system including an endless hinged belt disposed in a used coolant treatment tank in such a manner that the endless hinged belt travels to circulate while making a turn at a conveyor tail end and a chip discharge end, wherein a used coolant containing chips of different sizes is charged into the used coolant treatment tank from the above, the chips of different sizes contained in the used coolant are caught and then conveyed to the chip discharge end where the chips are discharged outside the used coolant treatment tank. The outer cleats are attached to an outer circumferential surface of the hinged belt. The chip discharge conveyor system further includes a partition plate disposed below a discharge run of the hinged belt in confronted relation to the discharged belt run along the length thereof, and a cylindrical member disposed inside the conveyor tail end where a return run of the hinged belt makes an upward turn. The cylindrical member extends in the width direction of the conveyor tail end so that small chips caught on the return belt run are transferred onto the partition plate via an outer circumferential surface of the cylindrical member and subsequently conveyed by means of an inner circumferential surface of the hinged belt and the partition plate.

In one preferred form of the present invention, inner cleats are attached to the inner circumferential surface of the hinged belt.

It is preferable that a discharge mechanism is provided to discharge the small chips from the partition plate in a lateral direction of the used coolant treatment tank.

The circulating endless hinged belt of the present invention has a discharge belt run formed on an upper side of the hinged belt, and a return belt run formed on a lower side of the hinged belt. The term "longitudinal direction" is used herein to refer to a direction parallel to the direction of travel of the circulating endless belt. The term "width direction" is used herein to refer to a direction perpendicular to the travel direction of the hinged belt. The term "large chips" is used herein to refer to long chips, curled chips, a mass of chips all having a size which can be blocked from passing through the hinged belt and thus trapped or caught by the discharge belt run. The term "small chips" is used herein to refer to those chips of a size that can sediment through the joint between adjacent two hinge plates, a clearance between each longitudinal edge of the hinged belt and the corresponding sidewall of the used coolant treatment tank, and a clearance formed in a side chain.

In the chip discharge conveyor system of the present invention, when a used coolant containing chips of different sizes is charged into the used coolant treatment tank, large chips are trapped or caught on the discharged belt run, then transported along the discharge belt run, and finally discharged outside the used coolant treatment tank. During that time, small chips, which have not been caught on the discharge belt run, partly settles by sedimentation on the partition plate. Another part of the small chips is caught on the return belt run (inner circumferential surface of the hinged belt), and the remainder of the small chips deposit by sedimentation onto the bottom of the used coolant treatment tank.

The small chips sedimented on the bottom of the treatment tank are scraped off by the outer cleats of the return belt run, then scooped up as the return belt run make an upward turn at the conveyor tail end, subsequently conveyed by the discharge belt run together with the large chips, and finally discharged from the discharge end to the outside of the used coolant treatment tank.

At the same time, small chips caught on the return belt run (the inner circumferential surface of the hinged belt) are conveyed by the return belt run until they arrive at the conveyor tail end. As the hinged belt makes an upward turn at the conveyor tail end, the small chips are transferred onto the partition plate via the cylindrical member located at a turning position of the hinged belt. Subsequently, the small chips are conveyed on and along the partition plate toward the discharge end together with chips sedimented on the partition plate, and at the discharge end, the small chips are discharged outside the used coolant treatment tank.

In this instance, if the inner cleats are not provided on the inner circumferential surface of the hinged belt, the small chips caught on the return belt run will be transferred along the circumferential surface of the cylindrical member onto the partition plate by means of hinge sleeves projecting outward from the respective joint portions between adjacent hinged plates of the hinged belt, and subsequently they are conveyed by the projecting hinged sleeves on and along the partition plate.

The inner cleats provided on the inner circumferential surface of the hinged belt operate to transfer the small chips from the return belt run onto the partition plate via the cylindrical member, and subsequently as the inner cleats advance with the discharge belt run, they convey the small chips along the partition plate toward the discharge end together with those chips sedimented on the partition plate. The thus provided inner cleats facilitate smooth transfer of the small chips from the return belt run to the partition plate at a turning position of the hinged belt and also achieve efficient conveyance of the transferred small chips and sediments of small chips on and along the partition plate.

Additionally, to make sure that the small chips which have been conveyed along the partition plate can be discharged outside the used coolant treatment tank, the discharge mechanism constructed to discharge the small chips from the partition plate in a lateral outward direction of the used coolant treatment tank is provided on the chip discharge end side. This facilitates efficient discharge of the small chips from a discharge end of the partition plate Lo the outside of the used coolant treatment tank.

DETAILED DESCRIPTION OF THE PREFERRED EMBODIMENTS

Figure 1:
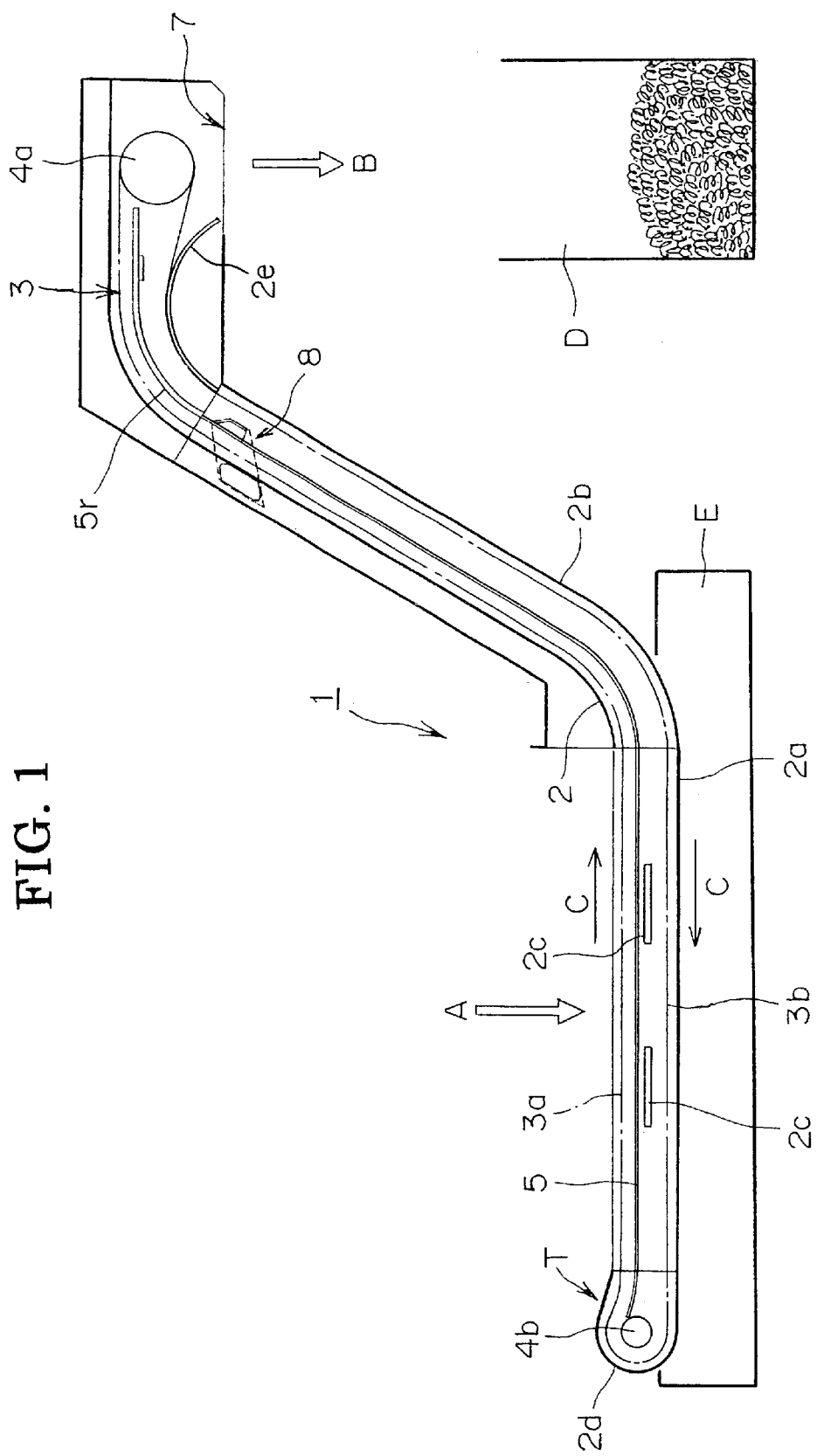
FIG. 1 is a diagrammatical side view of a chip discharge conveyor system according to a first embodiment of the present invention.
Figure 2:
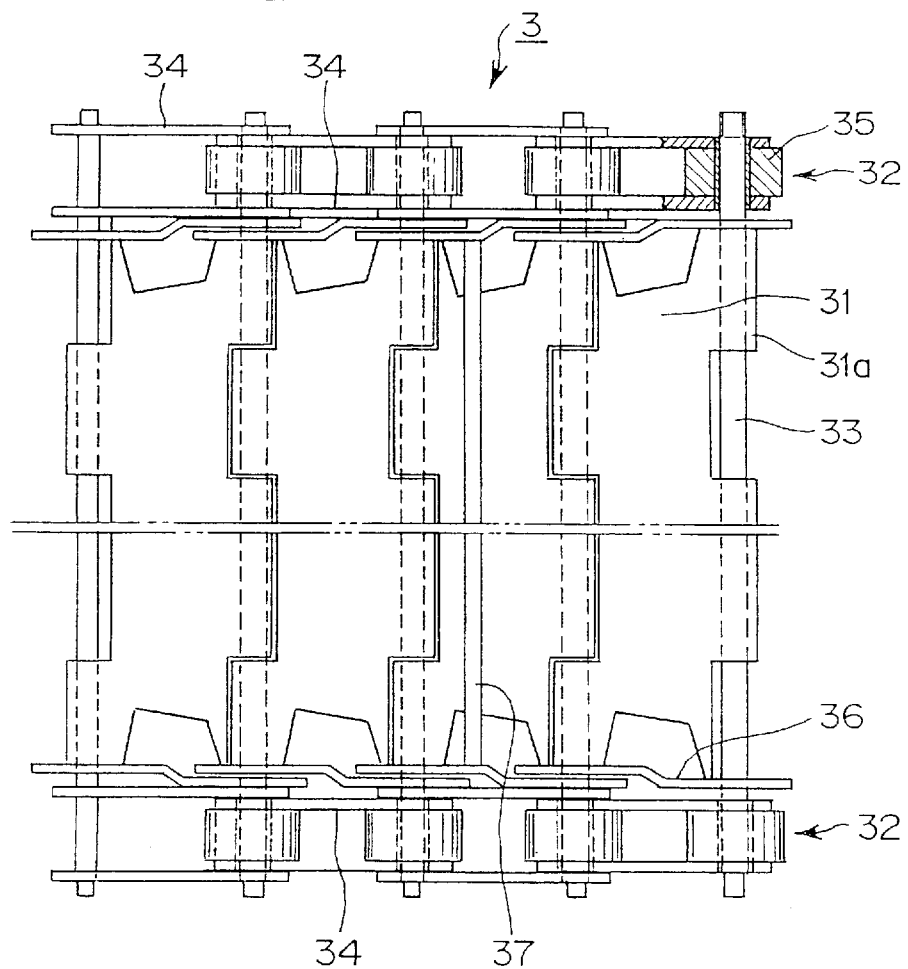
FIG. 2 is a fragmentary plan view of a hinged belt.

A first preferred embodiment of the present invention will be described with reference to FIGS. 1 to 7. As shown in FIGS. 1 and 2, a chip discharge conveyor system 1 in this embodiment generally comprises an endless hinged belt 3 disposed for circulation inside a used coolant treatment tank 2, a driving sprocket 4a around which a side chain 32 on each side of the hinged belt 3 is wound, a tail disk 4b located at a conveyor tail end T for guiding and supporting the side chain 32, and a partition plate 5 disposed between a discharge run 3a of the hinged belt 3 and a return run 3b of the hinged belt 3 disposed below the discharge belt run 3a. With the conveyor system 1 thus constructed, a used coolant containing chips of different sizes is charged into the used coolant treatment tank 2 from the above (in the direction of the arrow A in FIG. 1), and drained chips are discharged outside the used coolant treatment tank 2 at a position located above the used coolant treatment tank 2 off to the right (see, arrow B in FIG. 1).

The used coolant treatment tank 2 has a bottom wall formed jointly by a horizontal bottom plate 2a extending longitudinally of the treatment tank 2, and a sloped bottom plate 2b extending contiguously from the horizontal plate 2a in an oblique upward direction. As the hinged belt 3 circulates inside the treatment tank 2, the discharge belt run 3a travels continuously along a horizontal path and an upwardly inclined path in substantially parallel relation to the horizontal bottom plate 2a and sloped bottom plate 2b. At the same time, part of the return belt run 3b disposed above the horizontal bottom plate 2a travels along a path extending substantially parallel to the horizontal bottom plate 2a. In FIG. 1, reference character 2c denotes coolant effluent orifices formed in the treatment tank 2, 2d denotes a cover at the conveyor tail end T, C denotes an advancing direction of the hinged belt 3, D denotes a chip recovery box or container, and E denotes an effluent coolant reservoir.

As shown in FIG. 2, the hinged belt 3 is composed of a number of hinged plates 31 connected with one another by belt pins 33 inserted through hinge sleeves 31a. The hinged plates 31 are longitudinally arranged between a pair of side chains 32 each consisting of a roller chain. The hinge sleeves 31a each form together with one belt pin 33 a joint portion of the hinged plate 31, the hinge sleeve projecting outward from both the front and the rear surface of the hinged belt 3. The side chain 32 is composed of link plates 34 and rollers 35. The rollers 35 are mounted on the respective belt pins 33. The hinged plates 31 used herein are formed of a plain plate free from projections, openings and the like obstacles.

Figure 3:
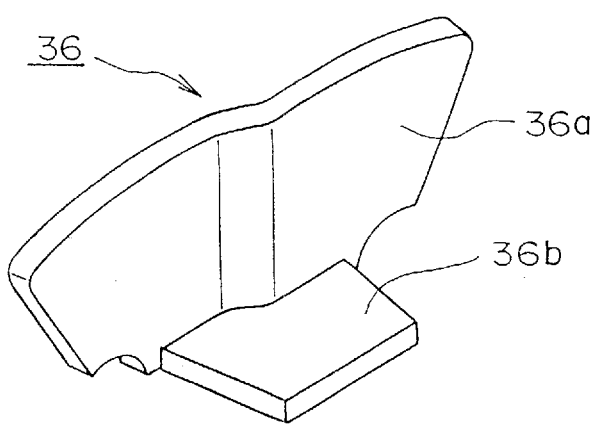
FIG. 3 is a perspective view of a side wing.

Each of the hinged plates 31 has a pair of side wings 36 attached to opposite ends thereof in the width direction of the hinged belt 3. As shown in FIG. 3, each of the side wings 36 is composed of a wing plate 36a and a mounting plate 36b and is attached to the hinged plate 31 via the mounting plate 36b. The wing plate 36a of one side wing 36 and the wing plate 36a of the adjacent side wing 36 overlap with each other in the width direction of the hinged belt 3 so that there is no space formed between adjacent two wing plates 36a even when the hinged belt 3 makes an upward turn at the conveyor tail end T.

Outer cleats 37 are attached to an outer circumferential surface of the hinged belt 3 at intervals of several hinged plates 31. Similarly, inner cleats 38 are attached to an inner circumferential surface of the hinged belt 3 at appropriate intervals. The inner cleats 38 are smaller in height than the outer cleats 37. The outer cleats 37 are designed to scrape and convey chips when a mass of chips deposited on the partition plates exceeds a predetermined height and to support or hold the chips on the discharge belt run 3a when the hinged belt 3 is traveling along the upwardly sloped path toward the discharge opening 7. The inner cleats 38 are designed to support chips (which have been caught on the return belt run 3) when the return belt run 3b makes an upward turn at the belt tail end T, thereby facilitate transfer of the chips onto the partition plate 5. The inner cleats 38 convey the thus transferred chips on and along the partition plate 5 together with those chips deposited on the partition plate 5.

The partition plate 5 disposed between the discharge belt run 3a and the return belt run 3b of the hinged belt 3 is comprised of a flat plate extending longitudinally below the discharge belt run 3a in confronted relation to the discharge belt run 3a. The partition plate 5 has opposite longitudinal edge portions serving as guide rails 5r for the discharge belt run 3a.

Figure 4:
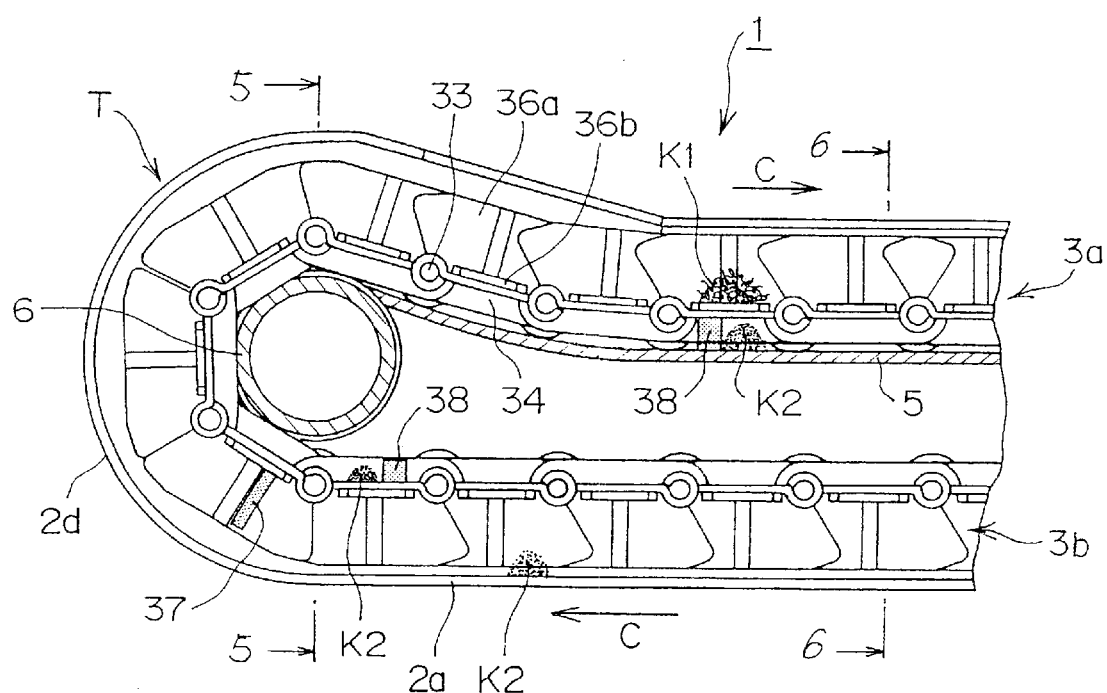
FIG. 4 is an enlarged cross-sectional view showing a conveyor tail end shown in FIG. 1.
Figure 5:
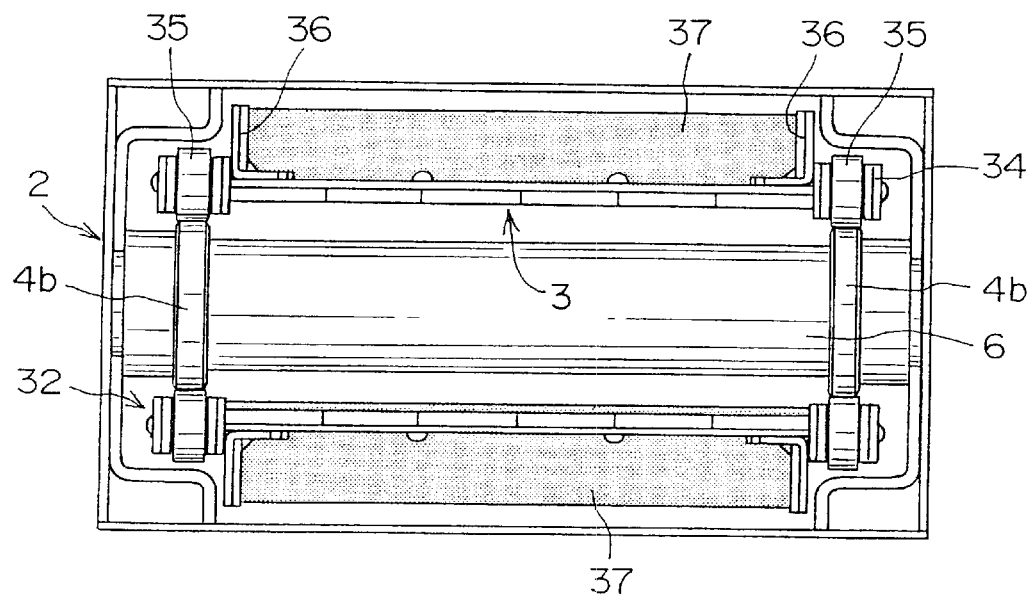
FIG. 5 is a cross-sectional view taken along line 5—5 of FIG. 4.
Figure 6:
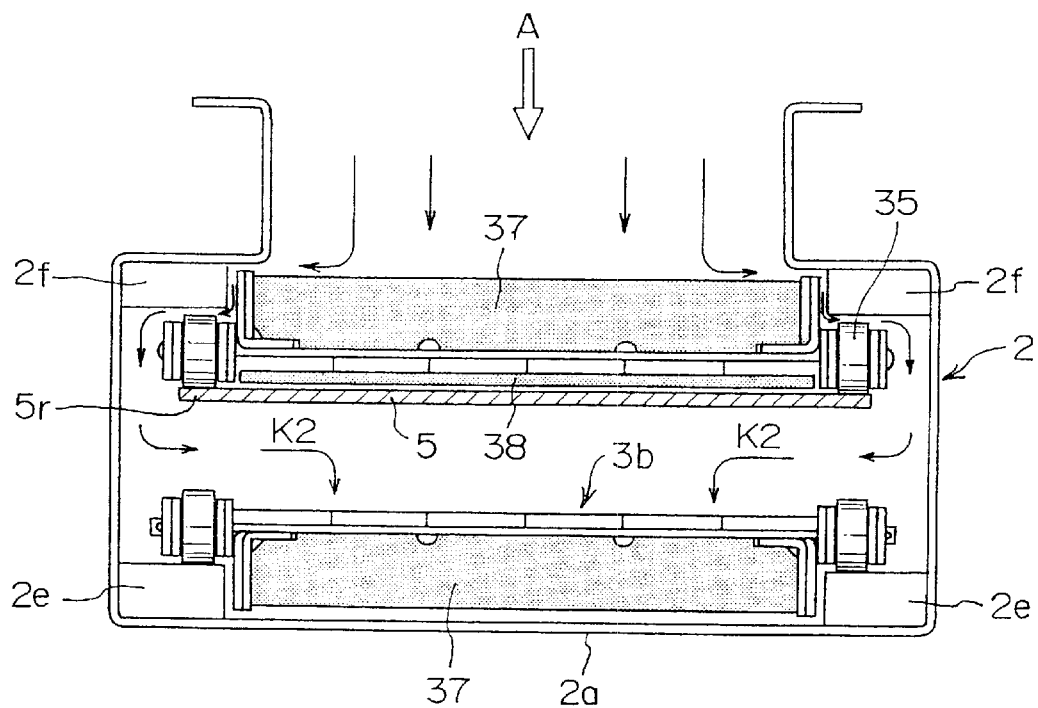
FIG. 6 is a cross-sectional view taken along line 6—6 of FIG. 4.

As shown in FIGS. 4 to 6, the pair of tail disks 4b for guiding and supporting the respective side chains 32 of the hinged belt 3 is disposed at a turning position where the circulating hinged belt 3 makes an upward turn at the conveyor tail end T. A cylindrical member 6 comprised of a pipe or a tube is disposed between the tail disks 4b and extends throughout the width of the used coolant treatment tank 2. The cylindrical member 6 functions, as an assist member, to guide and support the small chips K2 on and along an outer circumferential surface thereof when the small chips K2 are being conveyed upward and then transferred to the partition plate 5 by means of the inner cleats 38 when the hinged belt 3 makes an upward turn. The cylindrical member 6 should not be rotatable. In FIGS. 4–6, reference character 2e denotes return side rails 2e, and 2f denotes presser rails.

Figure 7:
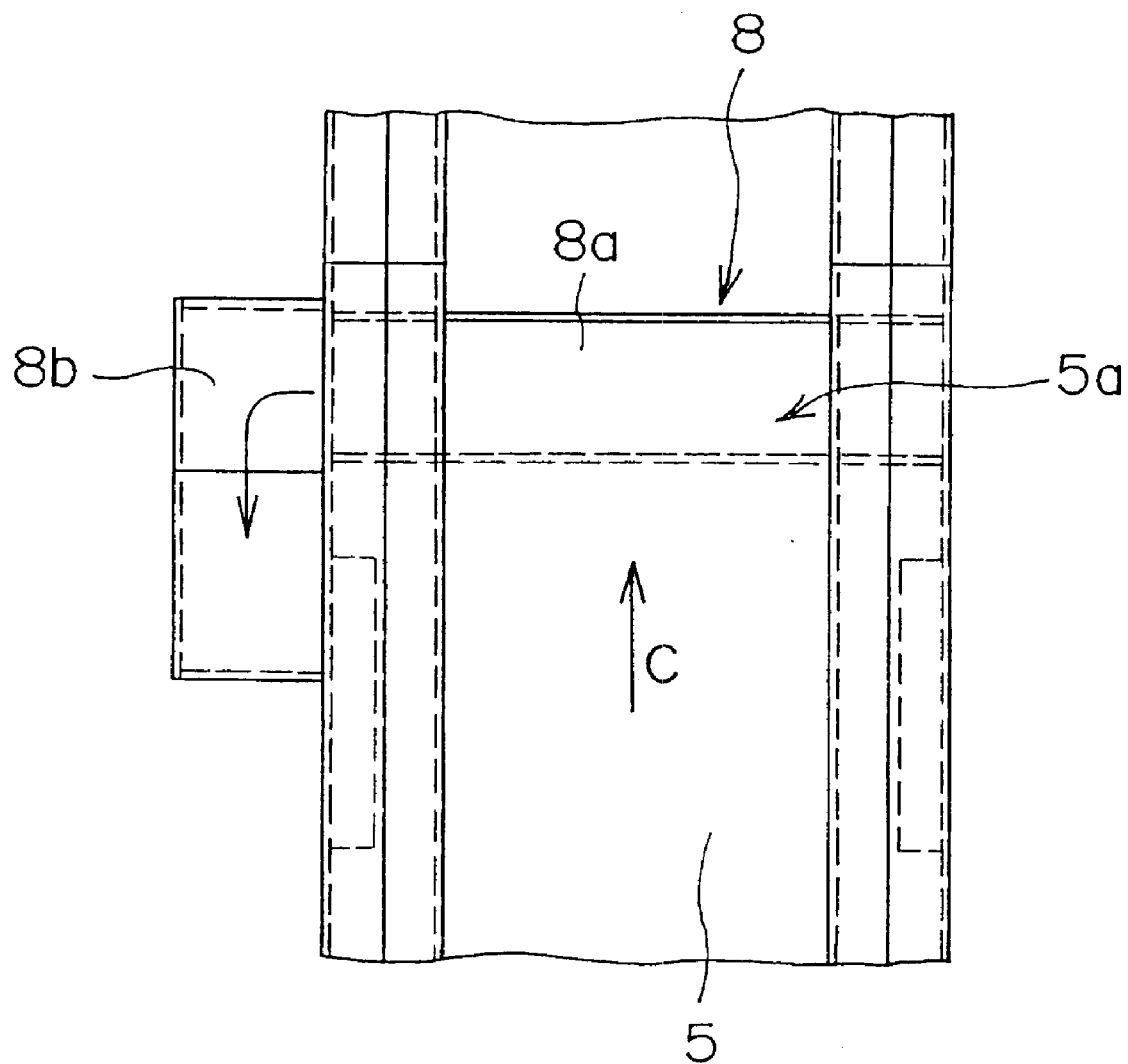
FIG. 7 is a diagrammatical plan view of a chip discharge mechanism.

The discharge opening 7 is located at the top of an upwardly sloped portion of the used coolant treatment tank 2, so that the large chips K1 conveyed by the discharge belt run 3a fall by gravity down from the discharge opening 7. As shown in FIGS. 1 and 7, the partition plate 5 has a trailing end (discharge end) located ahead of the top of the treatment tank 2, the trailing partition-plate end being partly cutout to form an opening 5a. A discharge mechanism 8 is disposed adjacent to the opening 5a for discharging the small chips K2 after they are conveyed along the partition plate. In order to discharge the small chips K2 in a lateral outward direction of the treatment tank 2, the discharge mechanism 8 is composed of a downwardly sloped trough-like chute 8a disposed below the opening 5a and extending transversely across the width of the treatment tank 2, and a downwardly sloped outer trough-like chute 8b extending from a lower end of the chute 8a in a direction parallel to a sidewall of the treatment tank 2.

The chip discharge conveyor system 1 of the foregoing construction operates as follows. The hinged belt 3 travels to circulate in the direction of the arrow C (FIG. 1) by rotation of the driving sprockets 4a. As shown in FIG. 1, a used coolant containing chips of different sizes is charged into the used coolant treatment tank 2 from the above (in the direction of the arrow A). Large chips K1 are caught on the discharge belt run 3a and conveyed toward the discharge opening 7. At the same time, part of small chips K2 sediment onto the horizontal bottom plate 2a and when the height of small chips K2 deposited on the bottom plate 2a exceeds a predetermined height, the small chips K2 are scraped by the outer cleats 37 of the return belt run 3b and conveyed toward the conveyor tail end T. At the conveyor tail end T, as the return belt run 3b makes an upward turn, the small chips K2 are scooped up with the outer cleats 38 and subsequently conveyed by the discharged belt run 3a together with the large chips K1. During that time, part of the small chips is allowed to sediment again. However, as the discharged belt run 3a further advances along the upwardly sloped bottom plate 2b, the chips are continuously held by the outer cleats 37 against falling and the coolant is drained off from the chips. At the top portion of the used coolant treatment tank 2, the discharge belt run 2a advances along a horizontal path again and makes a downward turn whereupon a mixture of the large chips and small chips falls by gravity down from the discharge opening 7 as indicated by the arrow B and is recovered in the chip recovery container D.

On the other hand, small chips K2 caught on the return belt run 3b, as the return belt run 3b makes an upward turn at the conveyor tail end T, are transferred onto the partition plate 5 along a path defined between the hinged belt 3 and an outer circumferential surface of the cylindrical member 6 while they are supported by the inner cleats 38 when the. The thus transferred small chips K2 and those small chips K2 which have already deposited on the partition plate 5 are conveyed by the inner cleats 38 in an oblique upward direction on and along the partition plate 5. At an upper end of the partition plate 5, the small chips K2 are discharged in a lateral outward direction of the used coolant treatment tank 2 by means of the discharge mechanism 8. The chip discharge conveyor system 1 employing the relatively low-profile inner cleats 38 is suitable for use with a used coolant in which small chips are contained at a ratio less than 20% of the total amount of chips.

FIGS. 8 to 12 show a chip discharge conveyor system according to a second embodiment of the present invention. The conveyor system 1' differs from the conveyor system 1 of the first embodiment only in the shape and configuration of a partition plate 5' and inner cleats 38' as well as the structure of a discharge mechanism 8'. These parts which are like or corresponding to those in the first embodiment are designated by the same reference characters, and a description given below will be directed mainly to structural differences.

Figure 8:
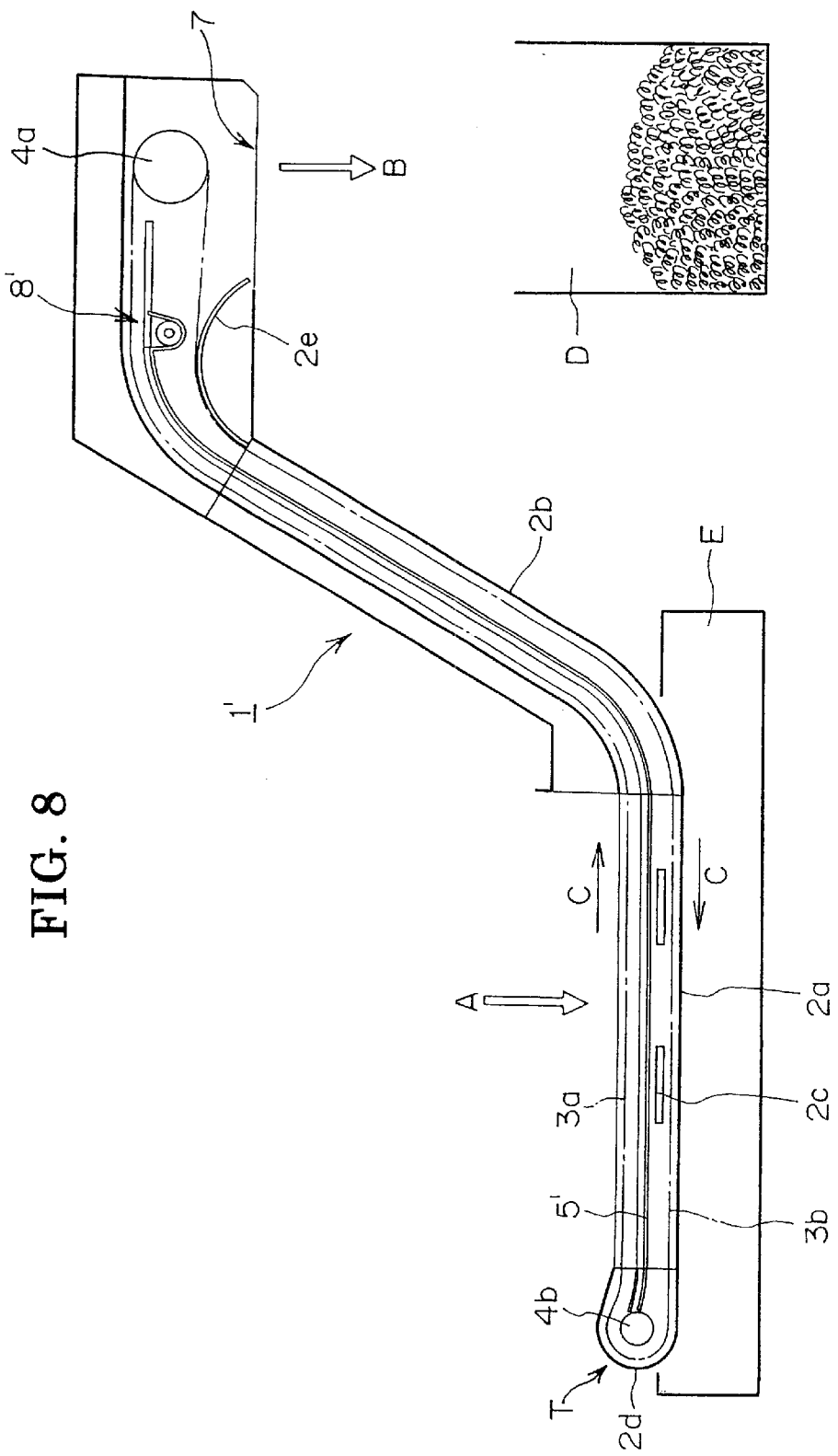
FIG. 8 is a diagrammatical side view of a chip discharge conveyor system according to a second embodiment of the present invention.
Figure 9:
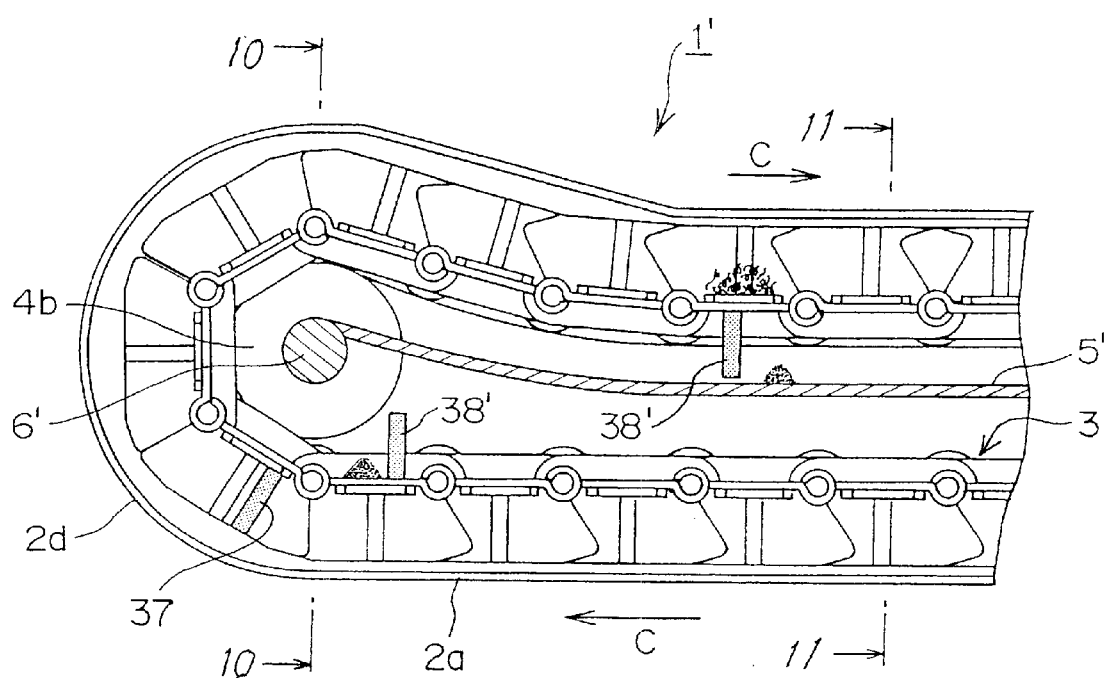
FIG. 9 is an enlarged cross-sectional view showing a conveyor tail end shown in FIG. 8.
Figure 11:
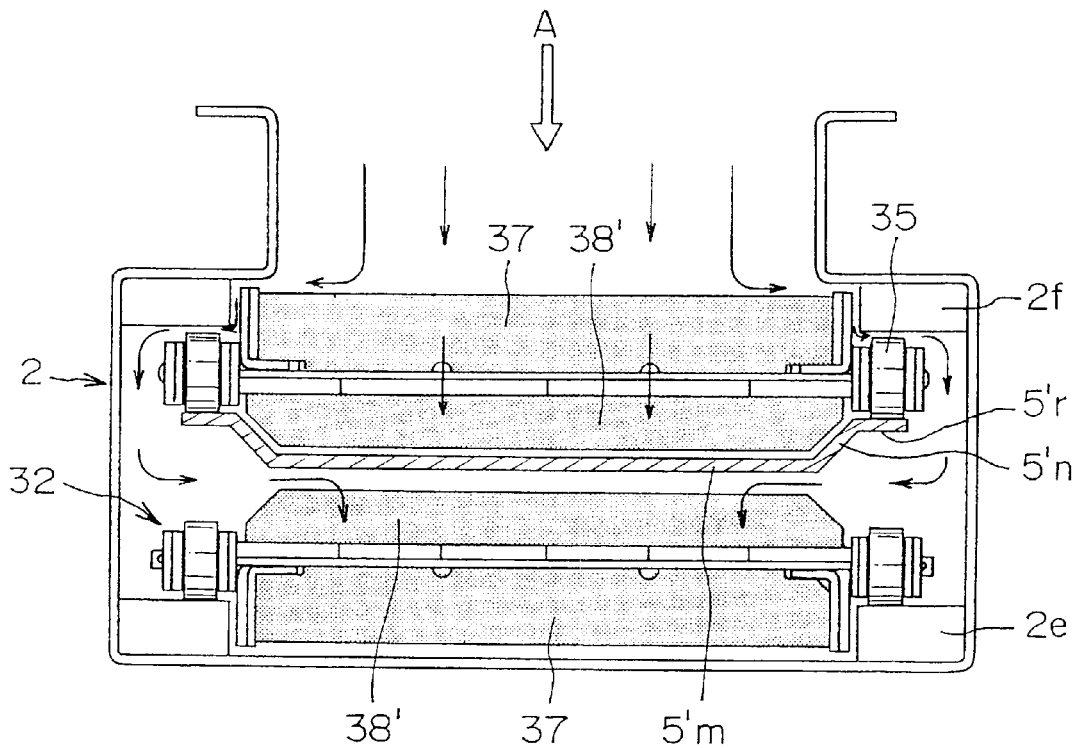
FIG. 11 is a cross-sectional view taken along line 11—11 of FIG. 9.

As shown in FIGS. 8 and 9, the chip discharge conveyor system 1' has a partition plate 5' disposed between a discharge belt run 3a and a return belt run 3b. The partition plate 5' is disposed below the discharge belt run 3a in confronted relation to the latter and extends in the longitudinal direction of the discharge belt run 3a. As shown in FIG. 11, the partition plate 5' has a flat plate portion 5'm extending transversely across the width of a central portion of the treatment tank 2, and a pair of inclined plate portions 5'n projecting upwardly and outwardly from opposite longitudinal edges of the flat plate portion 5'm. Respective outer edges of the inclined plate portions 5'm are shaped into flat guide rails 5're for the discharge belt run 3b.

Figure 10:
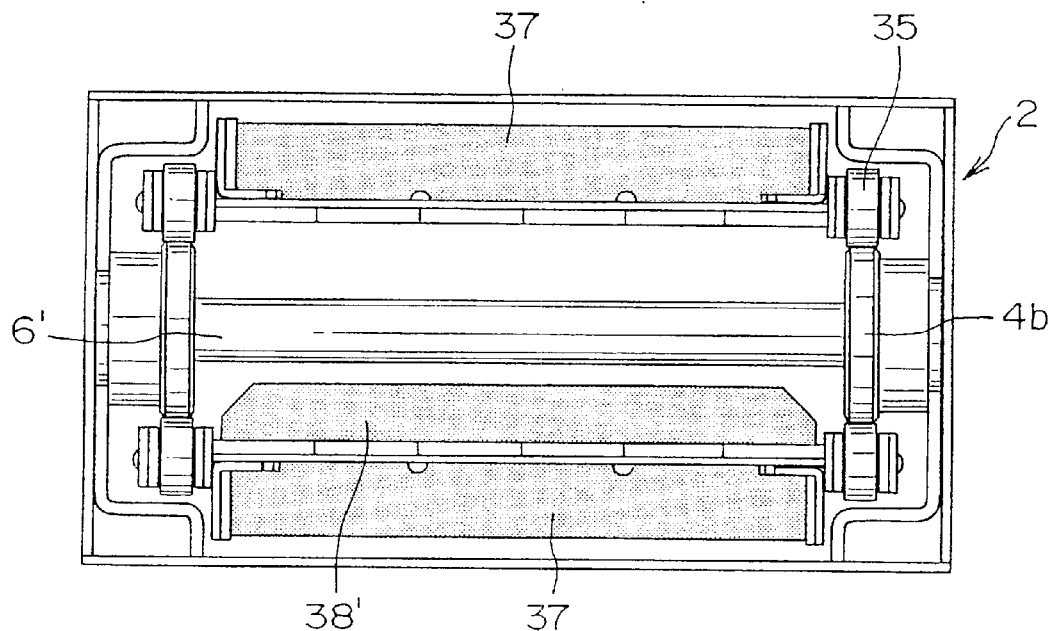
FIG. 10 is a cross-sectional view taken along line 10—10 of FIG. 9.

The hinged belt 3 has outer cleats 37 attached to an outer circumferential surface thereof and inner cleats 38' attached to an inner circumferential surface thereof. The inner cleats 38' are relatively large in height than the inner cleats 38 of the first embodiment. As shown in FIGS. 10 and 11, the inner cleats 38' are formed of a plate member having a shape complementary in contour to the cross-sectional shape of the partition plate 5' so that chips deposited on the partition plate 5' can be scraped off from the partition plate 5' and conveyed on and along the partition plate 5 by means of the inner cleats 38'. The partition plate 5' and the inner cleats 38' that are designed to match in contour can improve the chip conveyance capacity of the conveyor system 1'.

Figure 12:
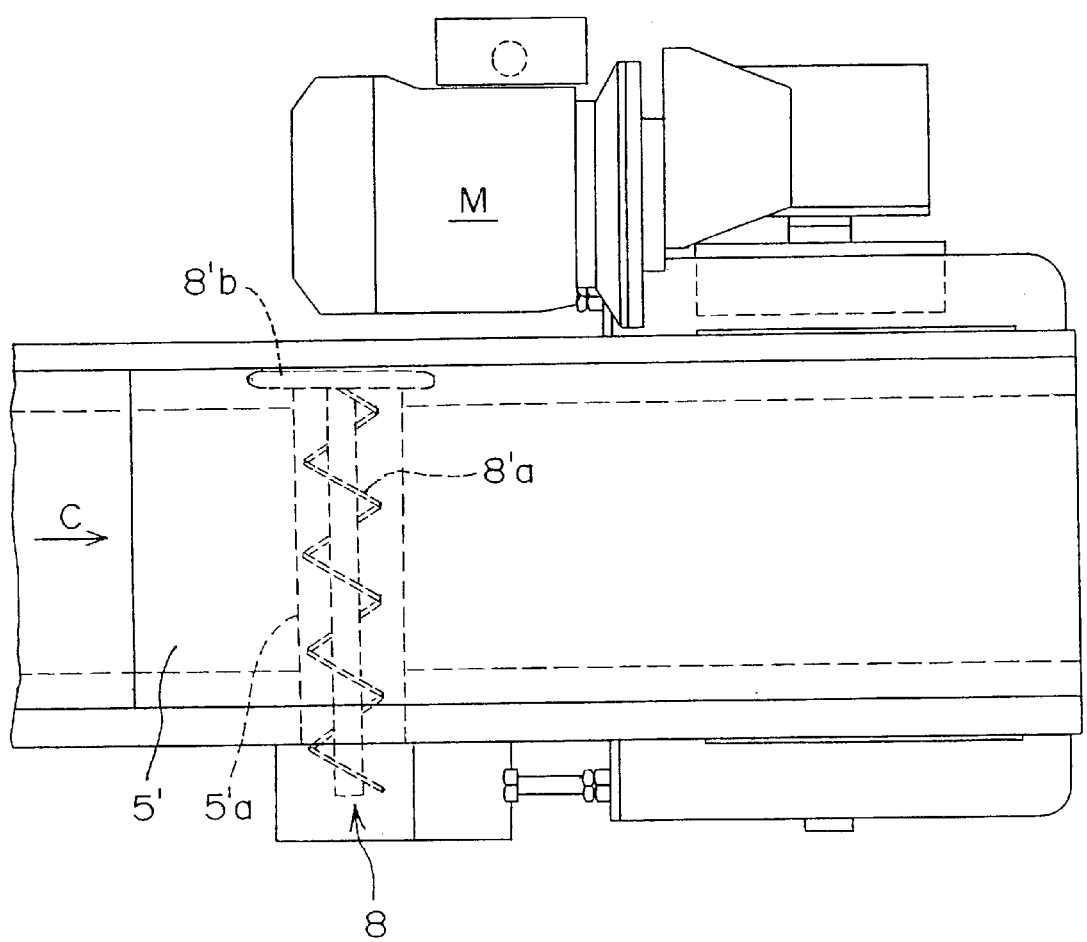
FIG. 12 is a diagrammatical plan view of a chip discharge mechanism.

A discharge mechanism 8' is disposed in a top portion of the used coolant treatment tank 2 for discharging chips that have been conveyed by the inner cleats 38' on and along the partition plate 5'. As shown in FIG. 12, the discharge mechanism 8' is composed of an opening 5'a formed in the partition plate 5', and a screw conveyor 8'a arranged to receive chips from the opening 5'a and discharge the chips in a lateral outward direction of the treatment tank 2. The screw conveyor 8'a is driven by a sprocket 8'b which is in driven mesh with one side chain 32 of the hinged conveyor 3. Reference character M shown in FIG. 12 denotes a drive source for driving the sprocket 4a for circulating the hinged belt 3.

The chip discharge conveyor system 1' of the foregoing construction operates as follows. As shown in FIG. 8, a used coolant containing chips of different sizes is charged into the used coolant treatment tank 2 from the above (in the direction of the arrow A). Large chips K1 are caught on the discharge belt run 3a and conveyed toward the discharge opening 7. At the same time, small chips K2 deposited by sedimentation on the horizontal bottom plate 2a are scooped up with the outer cleats 37 as the return belt run 3b makes an upward turn at the conveyor tail end T. The small chips K2 are subsequently conveyed by the discharged belt run 3a together with the large chips K1. Thereafter, as the discharge belt run 3b makes a downward turn at the top of the treatment tank 2, a mixture of the large chips K1 and small chips K2 falls by gravity down from the discharge opening 7 as indicated by the arrow B and is recovered in the chip recovery container D.

On the other hand, small chips K2 caught on the return belt run 3b, as the belt return run 3b makes an upward turn at the conveyor tail end T, are transferred onto the partition plate 5' along a circular path defined between the hinged conveyor 3 and an outer circumferential surface of the cylindrical member 6' while they are supported by the inner cleats 38'. The thus transferred small chips K2 and those small chips K2 which have already deposited on the partition plate 5' are conveyed by the inner cleats 38' in an oblique upward direction on and along the partition plate 5'. At an upper end of the partition plate 5', the small chips K2 are discharged outside the used coolant treatment tank 2 by means of the discharge mechanism 8' formed mainly by the screw conveyor 8'a. The chip discharge conveyor system 1' employing the relatively high-profile inner cleats 38 is suitable for use with a used coolant in which small chips are contained at a ratio of more than 40% of the total amount of chips.

Figure 13:
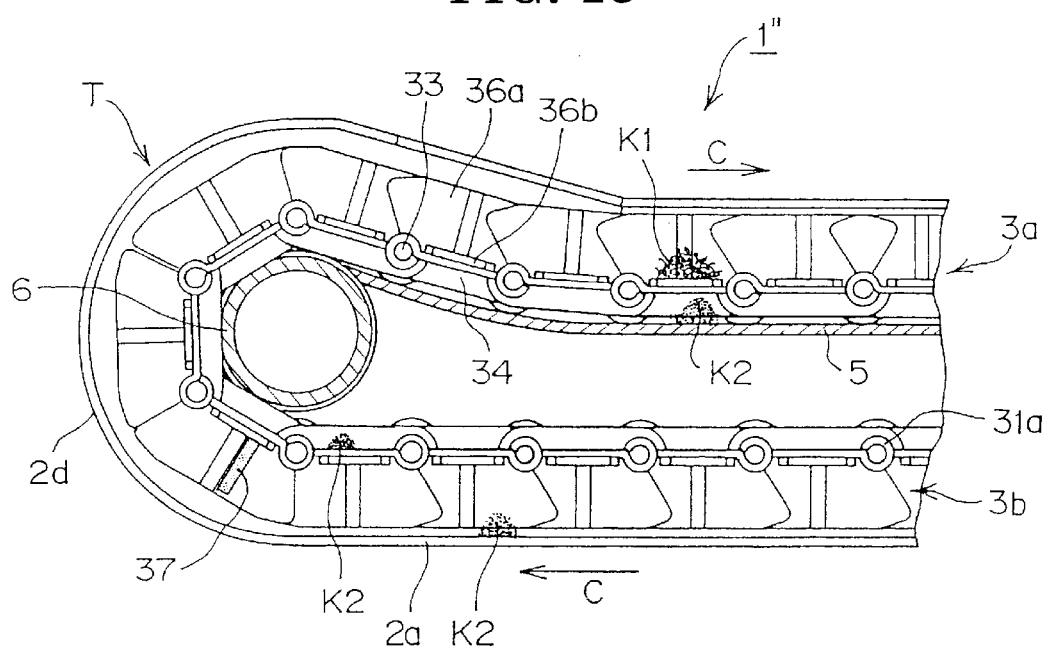
FIG. 13 is an enlarged cross-sectional view showing a conveyor tail end according to a third embodiment of the present invention.
Figure 14:
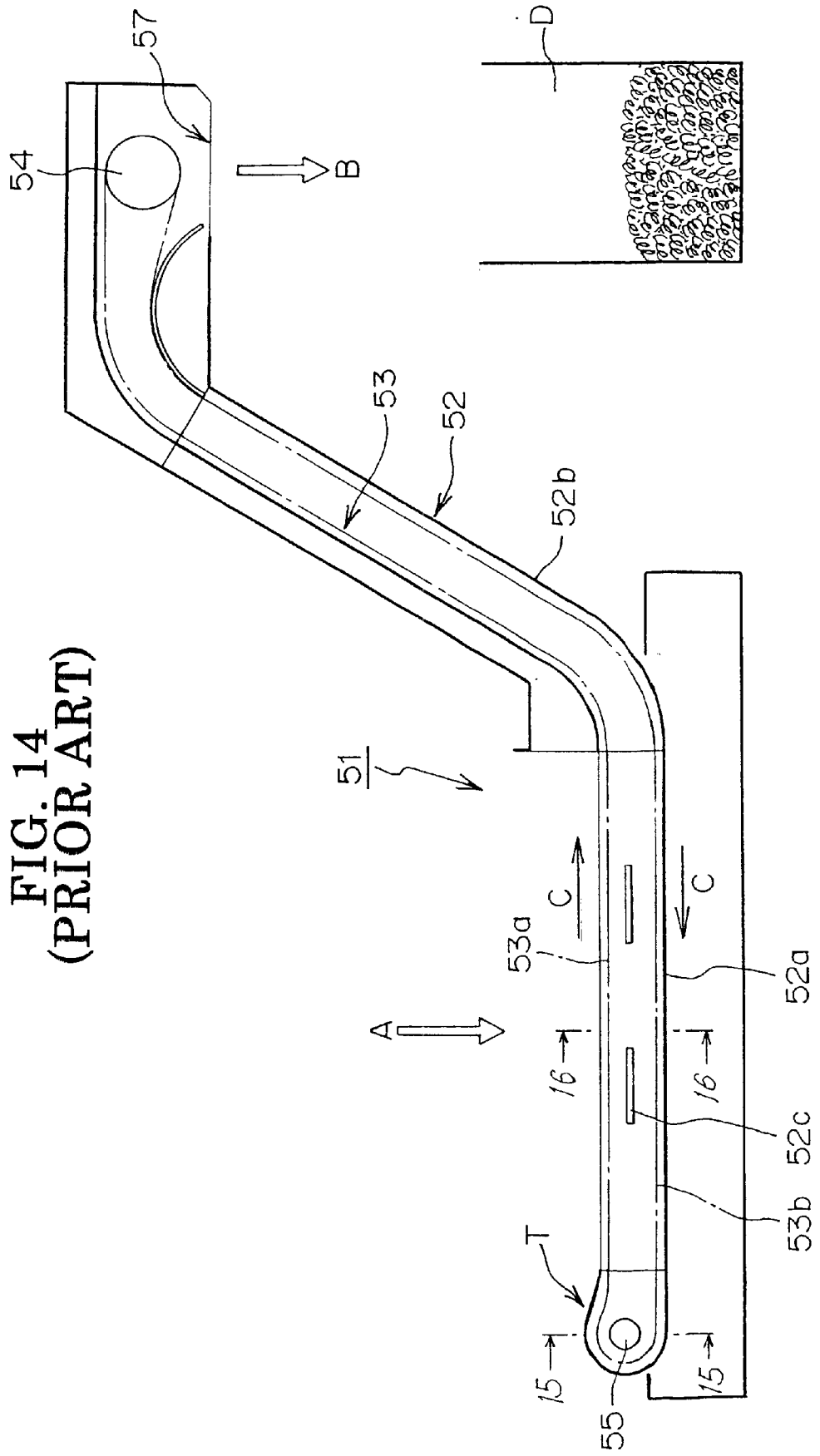
FIG. 14 is a diagrammatical side view of a conventional chip discharge conveyor system.
Figure 15:
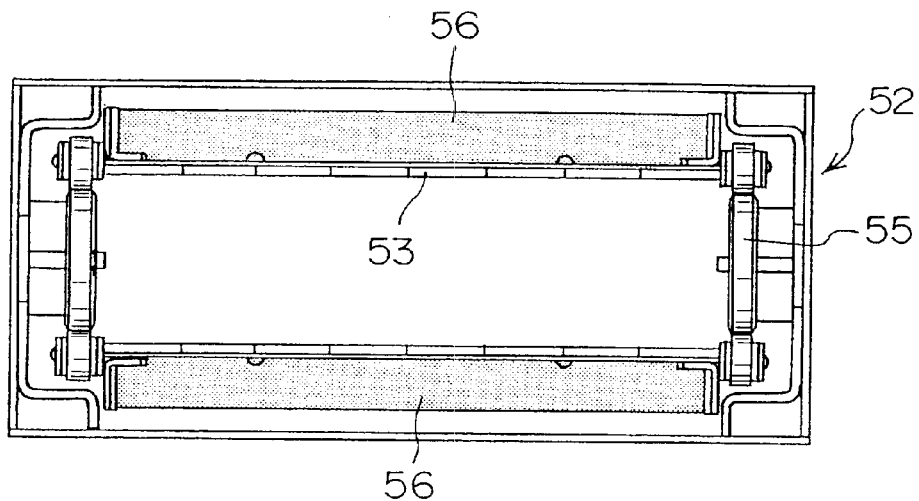
FIG. 15 is a cross-sectional view taken along line 15—15 of FIG. 14.
Figure 16:
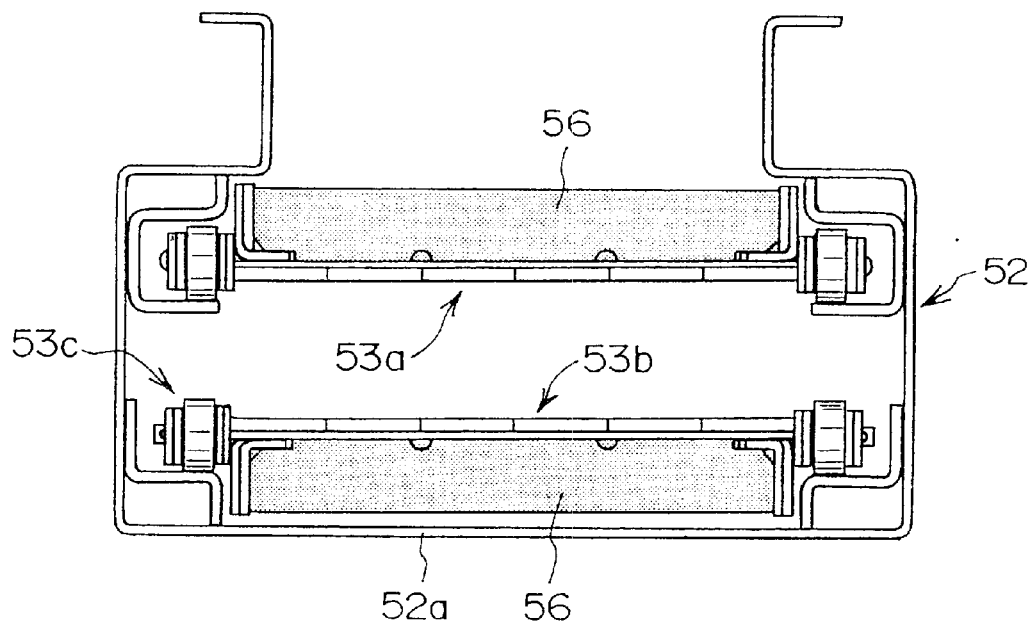
FIG. 16 is a cross-sectional view taken along line 16—16 of FIG. 14.

FIG. 13 shows a part of a chip discharge conveyor system according to a third embodiment of the present invention. The conveyor system 1" of this embodiment differs from the conveyor system 1 of the first embodiment only in that a hinged belt 3 does not have inner cleats. These parts which are like or corresponding to those in the first embodiment are designated by the same reference characters, and a description given below will be directed mainly to the operation of the conveyor system 1".

When a used coolant containing chips of different sizes is charged into the used coolant treatment tank 2 from the above, large chips K1 are caught on the discharge belt run 3a and conveyed toward the discharge opening 7. At the same time, part of small chips K2 sediment onto the horizontal bottom plate 2a and when the thickness of the small chips K2 deposited on the horizontal bottom plate 2a exceeds a predetermined height, the small chips K2 are scooped up with the outer cleats 37 of the return belt run 3b when the return belt run 3b makes an upward turn at the conveyor tail end T. The small chips K2 are subsequently conveyed by the discharged belt run 3a together with the large chips K1. Thereafter, as the discharge belt run 3b makes a downward turn at the top the treatment tank 2, a mixture of the large chips K1 and small chips K2 falls by gravity down from a discharge opening (not shown) and is recovered in a the chip recovery container (not shown).

On the other hand, small chips K2 caught on the return belt run 3b, as the return belt run 3b makes an upward turn at the conveyor tail end T, are transferred by the outwardly projecting hinge sleeves 31a of the hinged belt 3 onto the partition plate 5 via a clearance defined between the hinged belt 3 and an outer circumferential surface of the cylindrical member 6. The thus transferred small chips K2 and those small chips K2 which have already deposited on the partition plate 5 are conveyed by the hinge sleeves 31a on and along the partition plate 5 and finally discharged from the used coolant treatment tank 2. The chip discharge conveyor system 1" employing a hinged belt free from inner cleats is suitable for use with a used coolant in which small chips are contained in a range of 20 to 40% of the total amount of chips.

The certain preferred embodiments of the present invention have thus been illustrated and described. In each embodiment, the conveyor system includes a used coolant treatment tank having a horizontal bottom plate and an upwardly sloped bottom plate, and an endless hinged belt circulating inside the treatment tank and having a discharge end portion extending horizontally above an upper end of the sloped bottom plate for discharging the chips. The conveyor system may be modified in various ways. In one possible variant of the conveyor system, the used coolant treatment tank has a horizontal bottom plate and an upwardly sloped bottom plate, but the hinged belt does not have a horizontally extending discharge portion but discharges the chips from an upper end of an upwardly sloped portion thereof. In another variant of the conveyor system, the used coolant treatment tank is inclined as a whole and hence has an inclined bottom plate only. In a further variant of the conveyor system, the used coolant treatment tank is of the horizontal type and hence has a horizontal bottom plate only. In the last-mentioned variant, since the discharge belt run extends horizontally from the conveyor tail end to the discharge end, the conveyor system can be used in an application in which a used coolant is to be delivered to another location without separating chips from the used coolant.

The conveyor systems of the first- and second-mentioned variants may further include a drum filter disposed between the partition plate and the return belt run at a position where the horizontal bottom plate and upwardly inclined bottom plate of the treatment tank join together (i.e., where the discharge belt run running horizontally from the conveyor tail end change its direction of travel in an oblique upward direction). The drum filter thus provided filters the used coolant before the coolant is discharged. In this case, chips adhering to a surface of the drum filter are removed from the return belt run by means of a cleaning fluid ejected from the inside of the drum filter. The chips are then conveyed toward the conveyor tail end.

The hinged plates may comprise a plain plate as in the illustrated embodiments, a perforated plate having a number of small holes or perforations, a dimpled plate having a number of small hollows or dimples in one surface, or any combination of these. The hinge plates are preferably made of steel, but plastic hinge plates can be used.

In the illustrated embodiments, the conveyor tail end where the hinged belt makes an upward turn is arranged such that the hinged belt travels around a guide member at an angle of more than 180 degrees. In this arrangement, the discharge belt run, as it leaves from the guide member, moves obliquely. downward toward the return belt run and then advances horizontally in parallel to the return belt run (FIGS. 1, 4, 8 and 9). The angle of turn of the hinged belt may be limited to 180 degrees in which instance the discharge belt run, as it leaves from the guide member, moves parallel to the return belt run. Other forms of the conveyor tail end may be possible according to the present invention provided that the hinged belt makes an upward turn at a turning position located at the conveyor tail end.

In the illustrated embodiments, the discharge mechanism disposed between the discharge belt run and the return belt run for discharging small chips after the small chips are conveyed in an oblique upward direction on and along the partition plate is comprised of a trough type discharge mechanism (first embodiment) or a screw conveyor type discharge mechanism (second embodiment). The trough type discharge mechanism in the first embodiment may be replaced with the screw conveyor type discharge mechanism of the second embodiment, and vice versa. In addition, especially for discharging small chips, an ordinal belt conveyor or a coil conveyor may be used in place of the screw conveyor. When the coil conveyor is used, a flow of coolant, and preferably a jet of cleaning fluid ejected from a nozzle may be used in combination. The side chain of hinged conveyor which is used as a drive source for the discharge mechanism may be replaced with a separate motor such as a geared motor, or a hypoid gear motor.

As described above, the chip discharge conveyor system according to the present invention includes an endless hinged belt disposed in a used coolant treatment tank in such a manner that the endless hinged belt travels to circulate while making a turn at a conveyor tail end and a chip discharge end, wherein a used coolant containing chips of different sizes is charged into the used coolant treatment tank from the above, the chips of different sizes contained in the used coolant are caught and then transported to the chip discharge end where the chips are discharged outside the used coolant treatment tank. In the chip discharge conveyor system, outer cleats are attached to an outer circumferential surface of the hinged belt. With this arrangement, large chips are caught on a discharge run of the hinged bent and subsequently conveyed toward the discharge end. At the same time, small chips deposited by sedimentation on a horizontal bottom plate and an upwardly sloped bottom plate of the treatment tank are scraped off by the outer cleats, then scooped up as a return run of the hinged belt makes an upward turn at a conveyor tail end, and subsequently conveyed by the discharge belt run toward the discharge end together with the large chips.

The conveyor system further has a partition plate disposed below the discharge belt in confronted relation thereto along the length thereof, and a cylindrical member disposed inside the conveyor tail end where the return belt run makes an upward turn, the cylindrical member extending in the width direction of the conveyor tail end, so that small chips caught on the return belt run are transferred by outwardly projecting hinge sleeves of the hinged belt onto the partition plate via a clearance defined between the hinged belt and an outer circumferential surface of the cylindrical member as the return belt run makes an upward turn at the conveyor tail end. As a result, piling up of the chips at the upturned position of the hinged belt can be avoided. This will prevent an accidental stop of the conveyor system from occurring due to jamming of the chips and able to reduce the frequency of maintenance.

The small chips transferred to the partition plate and those chips which has deposited on the partition plate are conveyed by the outwardly projecting hinge sleeves of the hinged belt on and along the partition plate and finally discharged from the discharge end.

The chip discharge conveyor system may further include inner cleats attached to the inner circumferential surface of the hinged belt, in which instance when the belt return run makes an upward turn at the conveyor tail end with the small chips caught thereon, the inner cleats scoop the small chip upward along an arcuate path defined between the hinged belt and the cylindrical member and subsequently transfer the small chips onto the partition plate with improved efficiency. The transferred small chips and the chips deposited on the partition plate are conveyed by the inner cleats on and along the partition plate.

By virtue of the discharge mechanism provided to discharge the small chips from the partition plate in a lateral direction of the used coolant treatment tank, the small chips are discharged positively with improved efficiency.

The chip discharge conveyor system of the present invention, as distinct from the conventional one, is per se able to convey and discharge chips of different sizes contained in a used coolant, without requiring an additional conveyor system. This achieves a considerable reduction of the space for installation of the conveyor system.

Obviously, various minor changes and modifications of the present invention are possible in the light of the above teaching. It is therefore to be understood that within the scope of the appended claims, the present invention may be practiced otherwise than as specifically described.

What is claimed is:

1. A chip discharge conveyor system including an endless hinged belt, comprising a plurality of plates arranged in an endless loop, each plate having two opposite edges and being in edge-to-edge relationship with two adjacent plates and interlocked with said adjacent plates by hinges extending along said edges, the belt being disposed in a used coolant treatment tank in such a manner that the endless hinged belt travels in a circulating path within the tank while making a turn at a conveyor tail end and a chip discharge end, wherein a used coolant containing chips of different sizes is charged into the used coolant treatment tank from the above, and the chips of different sizes contained in the used coolant are caught and then transported to the chip discharge end where the chips are discharged outside the used coolant treatment tank (2), the improvement comprising:

outer cleats attached to an outer circumferential surface of the hinged belt;

a partition plate disposed below a discharge run of the hinged belt in confronted relation to the discharged belt run (3a) along the length thereof; and a cylindrical member disposed inside the conveyor tail end where a return run of the hinged belt makes an upward turn, the cylindrical member extending in the width direction of the conveyor tail end and being spaced from the return run of the belt at the location of said upward turn to provide a clearance between the belt and said return run such that small chips caught on the return belt run are transferred onto the partition plate by being drawn, within said clearance by said belt over a portion of the outer circumferential surface of the cylindrical member, and subsequently conveyed by means of an inner circumferential surface of the hinged belt along the partition plate.

2. The chip discharge conveyor system according to claim 1, wherein inner cleats are provided on the inner circumferential surface of the hinged belt.

3. The chip discharge conveyor system according to claim 1, wherein a discharge mechanism is provided to discharge the small chips from the partition plate in a lateral outward direction relative to the direction of travel of the belt.

4. The chip discharge conveyor system according to claim 2, wherein a discharge mechanism is provided to discharge the small chips from the partition plate in a lateral outward direction relative to the direction of travel of the belt.

5. The chip discharge conveyor system according to claim 1, wherein the partition plate has side edges and the tank has side walls, and wherein a space is provided between at least one of the side edges of the partition plate and an adjacent one of the side walls of the tank, whereby coolant is permitted to flow through said space from above the partition plate to the return run of the belt below the partition plate.

* * * * *